(12) United States Patent
Itagaki et al.

(10) Patent No.: US 8,570,708 B2
(45) Date of Patent: Oct. 29, 2013

(54) CERAMIC ELECTRONIC COMPONENT

(75) Inventors: Yoji Itagaki, Nagaokakyo (JP); Jun Kotani, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 13/527,671

(22) Filed: Jun. 20, 2012

(65) Prior Publication Data
US 2012/0326569 A1 Dec. 27, 2012

(30) Foreign Application Priority Data

Jun. 22, 2011 (JP) .................................. 2011-138175
Mar. 30, 2012 (JP) .................................. 2012-078669

(51) Int. Cl.
*H01G 4/228* (2006.01)

(52) U.S. Cl.
USPC ............... 361/306.3; 361/306.1; 361/303; 361/301.4; 361/321.1; 361/321.2

(58) Field of Classification Search
USPC ............... 361/306.3, 306.1, 303–305, 301.2, 361/301.4, 321.1, 321.2, 309, 311–313
See application file for complete search history.

(56) References Cited

U.S. PATENT DOCUMENTS

| | | | |
|---|---|---|---|
| 6,046,902 A * | 4/2000 | Nakagawa et al. | 361/306.1 |
| 6,201,683 B1 * | 3/2001 | Yamada et al. | 361/308.1 |
| 6,288,887 B1 * | 9/2001 | Yoshida et al. | 361/306.1 |
| 6,574,089 B1 * | 6/2003 | Moriwaki et al. | 361/306.3 |
| 6,940,708 B2 * | 9/2005 | Yoshii et al. | 361/303 |
| 7,436,649 B2 * | 10/2008 | Omura | 361/306.3 |
| 8,233,265 B2 * | 7/2012 | Otsuka et al. | 361/306.3 |

FOREIGN PATENT DOCUMENTS

| | | |
|---|---|---|
| EP | 2 131 374 A1 | 12/2009 |
| JP | 02-008125 U | 1/1990 |
| JP | 10-241989 A | 9/1998 |
| JP | 2009-026906 A | 2/2009 |
| JP | 2010-016326 A | 1/2010 |

* cited by examiner

*Primary Examiner* — Nguyen T Ha
(74) *Attorney, Agent, or Firm* — Keating & Bennett, LLP

(57) ABSTRACT

A ceramic electronic component includes two electronic-component main bodies and two metal terminals. Each of the metal terminals includes a base, ribs on left and right sides of the base, and a mounting portion below the base. The base includes two bonding portions to be bonded to respective external electrodes of the two electronic-component main bodies and cut-out portions each having a closed shape and being disposed below the respective bonding portions. The ribs are bent from the left and right sides of the base in the width direction toward the electronic-component main body. The ribs extend from the top of the base in the height direction to the vicinity of the mounting-side major surface of the mounting-side electronic-component main body and do not reach the mounting portion. The mounting portion is bent from the bottom of the base toward the electronic-component main body.

7 Claims, 14 Drawing Sheets

FIG. 13

| | METAL TERMINAL SHAPE | TENSILE TEST (DESTRUCTION STATE) | L-DIRECTION ADHERENCE TEST (DESTRUCTION STATE) |
|---|---|---|---|
| COMPARATIVE EXAMPLE 1 | 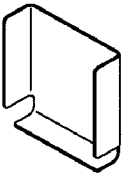 | 5N (LOWER BONDING PORTION DETACHED) | 35.9N (BONDING PORTION DETACHED) |
| EXAMPLE 1 | 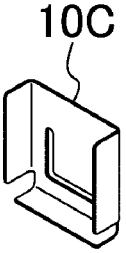 10C | 13N (LOWER BONDING PORTION DETACHED) | 133.7N (METAL TERMINAL BROKEN) |
| EXAMPLE 2 | 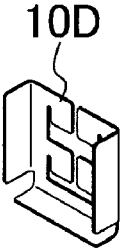 10D | 14N (LOWER BONDING PORTION DETACHED) | 94.5N (METAL TERMINAL BROKEN) |
| EXAMPLE 3 | 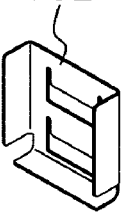 10B | 11N (LOWER BONDING PORTION DETACHED) | 93.5N (MOUNTING PORTION DETACHED) |

FIG. 14
| | METAL TERMINAL SHAPE | TENSILE TEST (DESTRUCTION STATE) |
|---|---|---|
| COMPARATIVE EXAMPLE 2 | 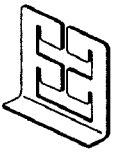 | 12N (LOWER BONDING PORTION DETACHED) |
| EXAMPLE 2 | 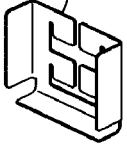 10D | 14N (LOWER BONDING PORTION DETACHED) |

# CERAMIC ELECTRONIC COMPONENT

BACKGROUND OF THE INVENTION

1. Field of the Invention

The present invention relates to a ceramic electronic component, such as a ceramic capacitor.

2. Description of the Related Art

Typically, in a ceramic electronic component with a metal terminal, an external electrode on the surface of the main body of the electronic component and the metal terminal are bonded to each other with eutectic solder or lead-free solder. However, when eutectic solder is used, if the ceramic electronic component is used under a high-temperature environment, a problem arises in that the eutectic solder is fused and the metal terminal is detached from the main body of the electronic component. When lead-free high-temperature solder (with a melting point of approximately 245° C.) is used, the bond strength between the metal terminal and the main body of the electronic component at ordinary temperatures is high. However, if the ceramic electronic component is used under a high-temperature environment (e.g., an environment exceeding 125° C.), a problem arises in that the lead-free high-temperature gradually softens and the bond strength between the metal terminal and the main body of the electronic component significantly decreases.

To prevent removal of the metal terminal and a significant decrease in the bond strength, a technique of diffusion-bonding a bonding portion of a metal terminal and an external electrode of the main body of an electronic component is proposed (see Japanese Unexamined Patent Application Publication No. 2010-16326). The metal terminal described in this patent document is substantially L-shaped and includes the bonding portion (the portion bonded to the external electrode of the main body of the electronic component) forming a portion of its vertical section and a mounting portion (the portion to be mounted on a mounting board) of its horizontal section.

For the metal terminal described in the above-mentioned patent document, if an external stress is exerted on the ceramic electronic component with the metal terminal, a problem arises in that the stress concentrates on a portion that is lower than the bonding portion of the metal terminal and located between the bonding portion and the mounting portion and the metal terminal is detached from the main body of the electronic component.

SUMMARY OF THE INVENTION

Accordingly, preferred embodiments of the present invention provide a ceramic electronic component including a metal terminal that is very resistant to detachment.

According to a preferred embodiment of the present invention, a ceramic electronic component includes at least one electronic-component main body and a metal terminal. The electronic-component main body includes two opposed major surfaces, two opposed end surfaces, two opposed side surfaces, and an external electrode that covers each of the end surfaces. The metal terminal is connected to the external electrode of the electronic-component main body by diffusion bonding. The metal terminal includes a base, ribs, and a mounting portion, the ribs being bent from both left and right sides of the base in a width direction connecting the two end surfaces of the electronic-component main body toward the electronic-component main body, the mounting portion being bent from a bottom of the base in a height direction connecting the two major surfaces of the electronic-component main body. The base includes a bonding portion bonded to the external electrode of the electronic-component main body and at least one cut-out portion that has a closed shape and that is disposed below the bonding portion in the height direction, and a predetermined distance is set between the cut-out portion in the base and the mounting portion. Each of the ribs extends from a top of the base in the height direction to a vicinity of the mounting-side major surface of the electronic-component main body and does not reach the mounting portion. The mounting portion is defined by a single unseparated surface.

By virtue of the cut-out portion having the closed shape disposed below the bonding portion of the base in the metal terminal, an externally applied stress is distributed to the cut-out portion and its surroundings. Accordingly, the externally applied stress is relieved without concentrating on the portion between the bonding portion and the mounting portion, and disengagement between the metal terminal and the electronic-component main body is reliably prevented. The ribs bent toward the electronic-component main body improve the rigidity of the metal terminal and compensate for a reduction in the mechanical strength of the metal terminal caused by the cut-out portion in the base. Accordingly, the adherence between the metal terminal and the electronic-component main body is maintained or increased.

The ribs extend from the top of the base in the height direction to the vicinity of the mounting-side major surface of the electronic-component main body bonded to the bonding portion and do not reach the mounting portion. Thus, a reduction in the mechanical strength of the metal terminal caused by the cut-out portion can be reliably compensated. In addition, because the predetermined distance is set between the cut-out portion and the mounting portion, the appropriately set distance ensures proper rigidity of the metal terminal.

According to a preferred embodiment of the present invention, the cut-out portion may extend around at least a partial perimeter of the bonding portion. Therefore, a portion that absorbs an externally applied stress can be ensured without having to increase the height of the ceramic electronic component such that the electronic component achieves a very low profile.

According to a preferred embodiment of the present invention, the cut-out portion may be substantially U-shaped. Therefore, an externally applied stress can be efficiently distributed.

According to a preferred embodiment of the present invention, the at least one electronic-component main body may include a plurality of electronic-component main bodies. According to a preferred embodiment of the present invention, when the at least one electronic-component main body includes the plurality of electronic-component main bodies, the at least one cut-out portion may include a plurality of cut-out portions each having a closed shape, each of the plurality of cut-out portions being disposed in a vicinity of a bottom of a respective one of the plurality of electronic-component main bodies. Therefore, an externally applied stress can be distributed for each bonding portion. According to a preferred embodiment of the present invention, of the plurality of cut-out portions, the cut-out portion adjacent to the mounting portion in a height direction of the metal terminal may have the smallest width.

According to a preferred embodiment of the present invention, the external electrode of the electronic-component main body may include an exposed copper surface.

With various preferred embodiments of the present invention, a ceramic electronic component including a metal terminal that is very difficult to detach even when a stress is externally applied is provided. In addition, the inclusion of a cut-out portion having a closed shape and extending around at least a partial perimeter of a bonding portion can ensure a portion that absorbs an externally applied stress without having to increase the height of the ceramic electronic component so as to ensure a low profile, and the ceramic electronic component in which the metal terminal is far more difficult to detach is provided.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 13 is a table that illustrates an advantageous effect of a cut-out portion having a closed shape of a metal terminal.

FIG. 14 is a table that illustrates an advantageous effect of a rib of a metal terminal.

DETAILED DESCRIPTION OF THE PREFERRED EMBODIMENTS

Figure 1:
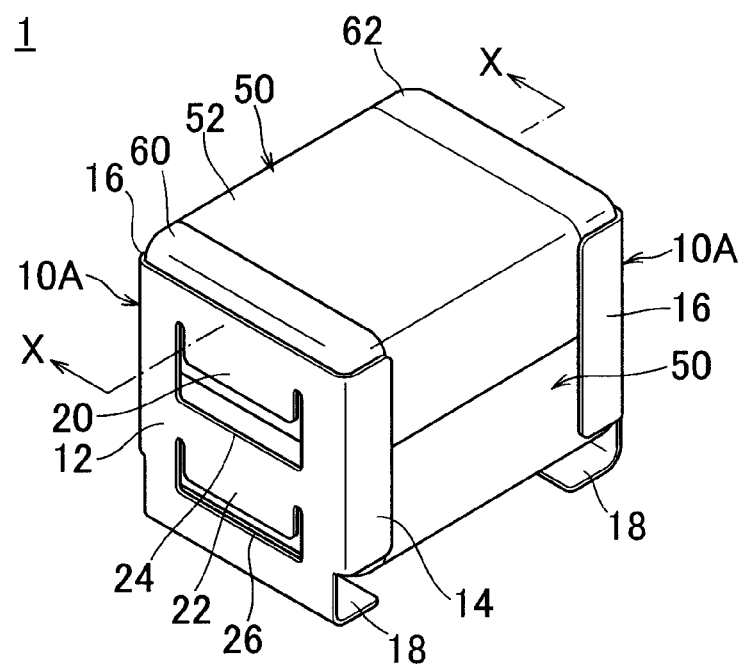
FIG. 1 is an external perspective view that illustrates a ceramic electronic component according to a preferred embodiment of the present invention.
Figure 2:
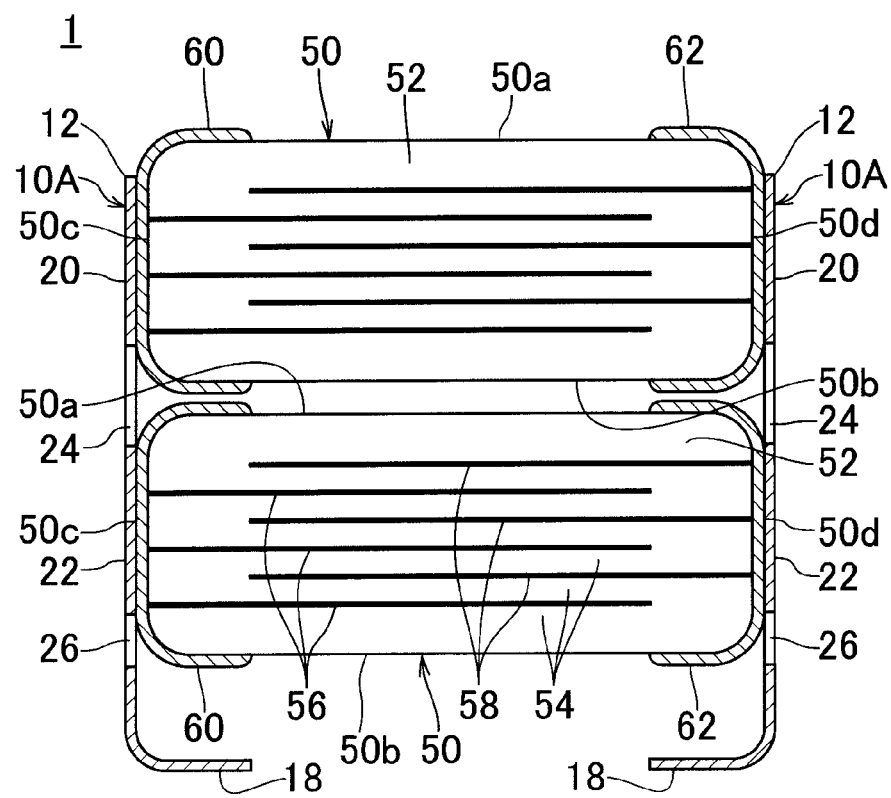
FIG. 2 is a cross-sectional view taken along X-X in FIG. 1.

FIG. 1 is an external perspective view that illustrates a ceramic electronic component according to a preferred embodiment of the present invention. FIG. 2 is a cross-sectional view taken along X-X in FIG. 1. A ceramic electronic component 1 includes two metal terminals 10A used as one set and a stack of two electronic-component main bodies 50 sandwiched between the metal terminals 10A.

Each of the electronic-component main bodies 50 includes two opposed major surfaces 50a and 50b, two opposed end surfaces 50c and 50d, and two opposed side surfaces. The electronic-component main body 50 includes a stack 52 preferably having a substantially rectangular parallelepiped shape and external electrodes 60 and 62 disposed on both ends (end surfaces 50c and 50d), respectively. The stack 52 includes a plurality of ceramic layers 54 and internal electrodes 56 and 58 disposed between the ceramic layers 54. The corners and ridges of the stack 52 include rounded portions R.

The internal electrode 56 is extended to one end surface (end surface 50c) of the stack 52 and is electrically coupled to the external electrode 60. The internal electrode 58 is extended to another end surface (end surface 50d) of the stack 52 and is electrically coupled to the external electrode 62. The internal electrodes 56 and 58 are opposed to each other such that the ceramic layer 54 is disposed therebetween, and the portion where they are opposed to each other generates an electrical characteristic (e.g., capacitance). Examples of the material of each of the internal electrodes 56 and 58 can include nickel, copper, silver, palladium, an alloy of silver and palladium, and gold. The thickness of each of the internal electrodes 56 and 58 preferably is about 0.3 μm to about 2.0 μm, for example. If the electronic-component main body 50 is not of a stacking type, the internal electrodes 56 and 58 are not provided.

The thickness of the ceramic layer 54 preferably is about 0.5 μm to about 10 μm, for example. An example of the material of the ceramic layer 54 can be a dielectric ceramic, and examples of the principal component of the dielectric ceramic can include principal components are barium titanate ($BaTiO_3$), calcium titanate ($CaTiO_3$), strontium titanate ($SrTiO_3$), and calcium zirconate ($CaZrO_3$). A dielectric ceramic in which any of accessory ingredients, such as a manganese compound, a magnesium compound, a silicon compound, a cobalt compound, a nickel compound, and a rare-earth compound is added to any of the above-mentioned principal components may also be used. Examples of the material of the ceramic layer 54 can include a piezoelectric ceramic, such as a lead zirconate titanate (PZT)-based ceramic, a semiconductor ceramic, such as a spinel-based ceramic, and a magnetic ceramic. When the dielectric ceramic is used, the electronic-component main body 50 functions as a capacitor element. When the piezoelectric element is used, the electronic-component main body 50 functions as a piezoelectric element. When the semiconductor ceramic is used, the electronic-component main body 50 functions as a thermistor element. When the magnetic ceramic is used, the electronic-component main body 50 functions as an inductor element. In the case of the inductor element, the internal electrodes 56 and 58 preferably are substantially coiled conductors, for example.

Examples of the material of each of the external electrodes 60 and 62 can include copper, nickel, silver, palladium, an alloy of silver and palladium, and gold, and it is used in an exposed state. Among them, copper may preferably be used in the exposed surface. In this case, in diffusion-bonding between the metal terminal 10A and each of the external electrodes 60 and 62, diffusion of the metal from a tin upper plating film on the surface of the metal terminal 10A to the copper external electrodes 60 and 62 is facilitated. The external electrodes 60 and 62 are electrically coupled to the internal electrodes 56 and 58, respectively, and may preferably have a single-layer structure. The external electrodes 60 and 62 may preferably contain a glass component, in addition to the above-mentioned metal. The thickness of each of the external electrodes 60 and 62 preferably is about 10 μm to about 50 μm, for example.

Figure 3:
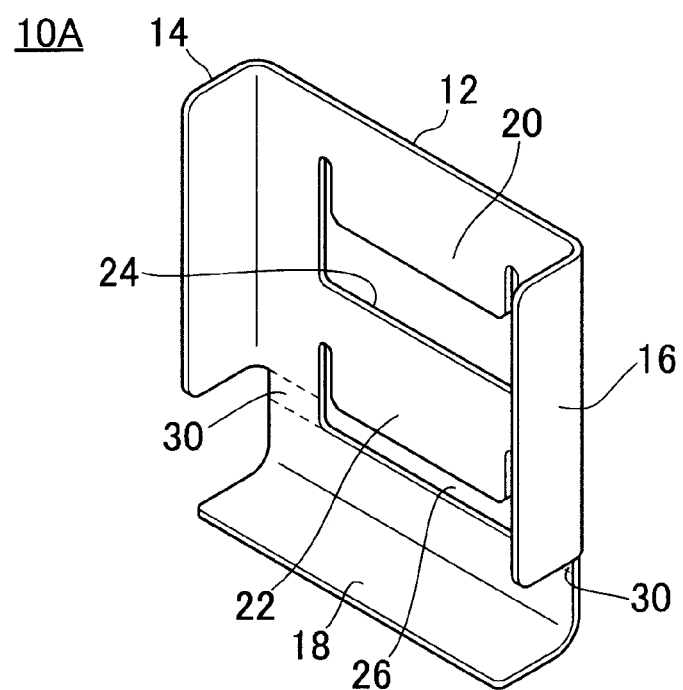
FIG. 3 is an external perspective view of a metal terminal illustrated in FIG. 1.
Figure 4:
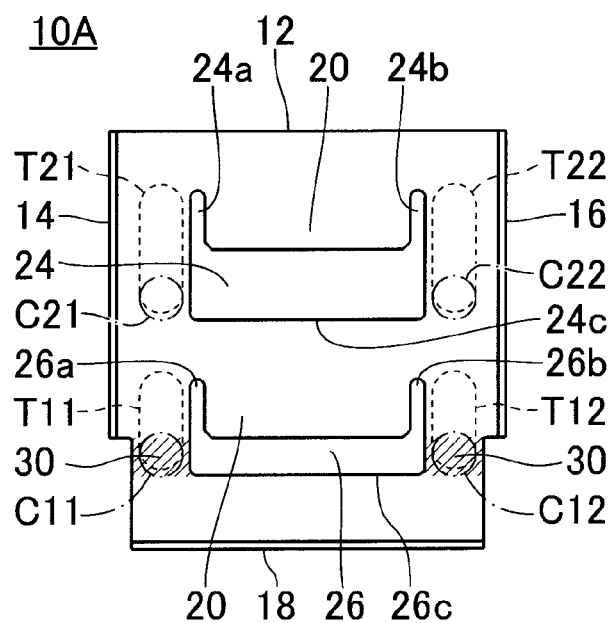
FIG. 4 is a front view of the metal terminal illustrated in FIG. 3.

The metal terminal 10A, which is illustrated in detail in FIGS. 3 and 4, is connected to the external electrode 60 or 62 disposed on each of the electronic-component main bodies 50. FIG. 3 is an external perspective view of the metal terminal 10A. FIG. 4 is a front view of the metal terminal 10A. In particular, the two metal terminals 10A preferably are used as one set and are of a type that sandwiches a stack of two electronic-component main bodies 50.

The base material of the metal terminal 10A preferably has a thickness of about 0.05 mm to about 0.5 mm, for example, and includes a metal such as nickel, iron, copper, silver, or chromium or an alloy having one or more of these metals as the principal component. Specifically, for example, stainless steel SUS430, Fe-42Ni alloy, or Fe-18Cr alloy can be used as the base material.

The surface of the base material is overlaid with a plating film that covers the exposed portion of the base material. The plating film includes a lower plating film and an upper plating film. The lower plating film preferably has a thickness of about 1.0 μm to about 5.0 μm, for example, and is made of a metal such as nickel, iron, copper, silver, or chromium or an alloy having one or more of these metals as the principal component. Making each of the base material and the lower plating film of a high-melting metal such as nickel, iron, or chromium or an alloy having one or more of these metals as the principal component can increase the heat resistance of the metal terminal 10A.

The upper plating film is disposed on the lower plating film. The upper plating film preferably has a thickness of about 1.0 μm to about 5.0 μm, for example, and is made of a metal such as tin, silver, or gold or an alloy having one or more of these metals as the principal component. Making the upper plating film of tin or an alloy having tin as the principal component can facilitate diffusion of the metal from the metal terminal 10A to the external electrodes 60 and 62 of the electronic-component main body 50 in diffusion-bonding (described below) between the metal terminal 10A and each of the external electrodes 60 and 62 of the electronic-component main body 50. Each of the lower plating film and the upper plating film may include a plurality of plating films.

The metal terminal 10A includes a substantially rectangular base 12, ribs 14 and 16 disposed on the left and right sides of the base 12, respectively, and a mounting portion 18 disposed below the base 12. Because the metal terminal 10A preferably is of a type that holds a stack of the two electronic-component main bodies 50, the base 12 includes two substantially rectangular bonding portions 20 and 22 to be bonded to the respective external electrodes of the two electronic-component main bodies 50 and cut-out portions 24 and 26 each having a closed shape, the cut-out portions 24 and 26 being disposed below the bonding portions 20 and 22, respectively, in the height direction of the metal terminal 10A (in other words, the height direction of the electronic-component main bodies 50). The bonding portions 20 and 22 are disposed at a substantially central location in the upper section of the base 12 and at a substantially central location in a substantially central section of the base 12, respectively. The bonding portion 20 is bonded to the external electrode 60 or 62 of the electronic-component main body 50 in the upper tier. The bonding portion 22 is bonded to the external electrode 60 or 62 of the electronic-component main body 50 in the lower tier (on the mounting side).

The cut-out portion 24 is substantially U-shaped and extends around at least a partial perimeter of the bonding portion 20 in the vicinity of the border between the two electronic-component main bodies 50. The cut-out portion 26 is substantially U-shaped and extends around at least a partial perimeter of the bonding portion 22 in the vicinity of the mounting-side major surface 50b of the electronic-component main body 50 in the lower tier. By virtue of the cut-out portion 24 being provided below the bonding portion 20 and the cut-out portion 26 being provided below the bonding portion 22, an externally applied stress is distributed to the cut-out portions 24 and 26 and their surroundings and relieved. Accordingly, disengagement between the metal terminal 10A and the electronic-component main body 50 can be reliably prevented, and the bonding portion is protected.

An operational advantage of the substantially U-shaped cut-out portions 24 and 26 is described in detail below with reference to FIG. 4. For the sake of description, the substantially U-shaped cut-out portion 24 is classified into a horizontal section 24c extending in a substantially horizontal direction and vertical sections 24a and 24b upwardly extending from both ends of the horizontal section 24c in a substantially vertical direction (height direction). Similarly, the substantially U-shaped cut-out portion 26 is classified into a horizontal section 26c extending in a substantially horizontal direction and vertical sections 26a and 26b upwardly extending from both ends of the horizontal section 26c in a substantially vertical direction (height direction).

Here, the case where the cut-out portions 24 and 26 do not include the vertical sections 24a and 24b and the vertical sections 26a and 26b, respectively, and only include the horizontal sections 24c and 26c, respectively (that is, the case where the cut-out portions 24 and 26 do not surround the bonding portions 20 and 22, respectively), is discussed. In this case, a substantially circular portion C21 (indicated by the dot-dash line) between the left side end of the horizontal section 24c of the cut-out portion 24 and the left side end of the base 12 is a portion that absorbs an externally applied stress, and a substantially circular portion C22 (indicated by the dot-dash line) between the right side end of the horizontal section 24c of the cut-out portion 24 and the right side end of the base 12 is a portion that absorbs an externally applied stress. Similarly, a substantially circular portion C11 (indicated by the dot-dash line) between the left side end of the horizontal section 26c of the cut-out portion 26 and the left side end of the base 12 is a portion that absorbs an externally applied stress, and a substantially circular portion C12 (indicated by the dot-dash line) between the right side end of the horizontal section 26c of the cut-out portion 26 and the right side end of the base 12 is a portion that absorbs an externally applied stress. Accordingly, if the cut-out portions 24 and 26 do not surround the bonding portions 20 and 22, respectively, only the substantially circular sections C11 to C22 adjacent to both side ends of the horizontal section 24c of the cut-out portion 24 and the horizontal section 26c of the cut-out portion 26 are the portions that absorb an externally applied stress. As a result, the size of the portions that absorb an externally applied stress is small, and it is difficult to sufficiently absorb an externally applied stress.

In contrast, as in the present preferred embodiment, when the cut-out portions 24 and 26 include the vertical sections 24a and 24b and the vertical sections 26a and 26b, respectively, and the horizontal sections 24c and 26c, respectively (that is, when the cut-out portions 24 and 26 extend around at least partial perimeters of the bonding portions 20 and 22, respectively), a substantially oblong section T21 (indicated by the broken line) between the left side end of the base 12 and each of the left side end of the horizontal section 24c and the vertical section 24a of the cut-out portion 24 is a portion that absorbs an externally applied stress, and a substantially oblong section T22 (indicated by the broken line) between the right side end of the base 12 and each of the right side end of the horizontal section 24c and the vertical section 24b of the cut-out portion 24 is a portion that absorbs an externally applied stress. Similarly, a substantially oblong section T11 (indicated by the broken line) between the left side end of the base 12 and each of the left side end of the horizontal section 26c and the vertical section 26a of the cut-out portion 26 is a portion that absorbs an externally applied stress, and a substantially oblong section T12 (indicated by the broken line)

between the right side end of the base 12 and each of the right side end of the horizontal section 26c and the vertical section 26b of the cut-out portion 26 is a portion that absorbs an externally applied stress. Accordingly, when the cut-out portions 24 and 26 extend around at least partial perimeters of the bonding portions 20 and 22, respectively, the portions that absorb an externally applied stress have a large size of the substantially oblong sections T11 to T22 without an increase in the height of the metal terminal 10A. As a result, an externally applied stress can be sufficiently absorbed while a height reduction is achieved. Therefore, the ceramic electronic component 1 including the metal terminal 10A more difficult to detach is obtainable.

The vertical sections 24a and 24b of the cut-out portion 24 and the vertical sections 26a and 26b of the cut-out portion 26 may preferably upwardly extend from both ends of the horizontal section 24c and both ends of the horizontal section 26c, respectively, in a substantially vertical direction (height direction), and the horizontal sections 24c and 26c may preferably be disposed below the respective bonding portions. Each of the horizontal section 24c of the cut-out portion 24 and the horizontal section 26c of the cut-out portion 26 may preferably be disposed in the vicinity of the bottom of a corresponding one of the two electronic-component main bodies 50. In other words, when the plurality of electronic-component main bodies 50 are used, each of the plurality of electronic component main bodies 50 corresponds to one of the cut-out portions 24 and 26, and each of the cut-out portions 24 and 26 may preferably be disposed in the vicinity of the bottom of a corresponding electronic-component main body 50. Therefore, an externally applied stress can be distributed to each of the bonding portions, and the above-described advantageous effect can be further enhanced.

In the height direction of the metal terminal 10A, the width of the cut-out portion 26 is narrower than the width of the cut-out portion 24, and a predetermined distance is set between the cut-out portion 26 and the mounting portion 18. The appropriately set distance can ensure proper rigidity of the metal terminal 10A. If this distance is too short, the rigidity of the metal terminal 10A may be so low that the metal terminal 10A is easily plastically deformed by an externally applied stress.

The ribs 14 and 16 are bent at substantially right angles from the left and right sides in the width direction of the base 12 toward the electronic-component main body 50, extend from the top in the height direction of the base 12 along the direction connecting the two end surfaces 50c and 50d of the electronic-component main body 50, and do not reach the mounting portion 18. The ribs 14 and 16 are not in contact with the electronic-component main bodies 50. The ribs 14 and 16 increase the rigidity of the metal terminal 10A and compensate for a reduction in the mechanical strength of the metal terminal 10A caused by the cut-out portions 24 and 26 provided in the base 12. Accordingly, the adherence between the metal terminal 10A and the electronic-component main bodies 50 is maintained or increased. The ribs 14 and 16 extend from the top in the height direction of the base 12 to the vicinity of the mounting-side major surface 50b of the electronic-component main body 50 in the lower tier (on the mounting side). This can increase the rigidity of the metal terminal 10A and can reliably compensate for a reduction in the mechanical strength of the metal terminal 10A cause by the cut-out portions 24 and 26.

The mounting portion 18 is bent at a substantially right angle from the bottom of the base 12 toward the electronic-component main body 50. As described below, the mounting portion 18 is soldered to a land on a mounting board in mounting the ceramic electronic component 1. The mounting surface of the mounting portion 18 is preferably defined by a single integral surface. The mounting portion 18 may be bent at a substantially right angle in a direction opposite to the electronic-component main body 50. The corner of the mounting portion 18 bent at a substantially right angle may be rounded. When the mounting portion 18 is bent at a substantially right angle from the bottom of the base 12 toward the electronic-component main body 50, the length of the mounting portion 18 along the direction connecting the two end surfaces 50c and 50d of the electronic-component main body 50 may be longer than the length of the external electrode of the electronic component in the direction connecting the two end surfaces. With this unique structure, in mounting the ceramic electronic component 1, when the ceramic electronic component 1 is observed from below by a camera and an image is recognized to detect the location of a component, the external electrodes 60 and 62 of the ceramic electronic component 1 can be prevented from being incorrectly identified as a metal terminal and detection error can be avoided.

The two electronic-component main bodies 50 are held by the pair of the metal terminals 10A, and the external electrodes 60 and 62 of the electronic-component main bodies 50 and the bonding portions 20 and 22 of the metal terminals 10A are connected by diffusion-bonding. The two electronic-component main bodies 50 are stacked such that the lower major surface 50b of the electronic-component main body 50 in the upper tier faces the upper major surface 50a of the electronic-component main body 50 in the lower tier. The electronic-component main body 50 in the upper tier is bonded to the metal terminals 10A such that its upper surface (upper major surface) 50a extends above the top of each of the metal terminals 10A slightly (for example, preferably by approximately 0.5 mm in the present preferred embodiment). In this way, the corners of the metal terminal 10A are lower than the upper surface of the electronic-component main body 50 in the upper tier, and the rounded portions R of the electronic component main body 50 in the upper tier can prevent a problem that is caused by snagging.

The upper bonding portion 20 of the metal terminal 10A is diffusion-bonded to the external electrode 60 or 62 of the electronic-component main body 50 in the upper tier. The lower bonding portion 22 is diffusion-bonded to the external electrode 60 or 62 of the electronic-component main body 50 in the lower tier (on the mounting side). The upper substantially U-shaped cut-out portion 24 of the metal terminal 10A is arranged in the vicinity of the border between the two electronic-component main bodies 50. The lower substantially U-shaped cut-out portion 26 is arranged in the vicinity of the mounting-side major surface 50b of the electronic-component main body 50 in the lower tier. Because the corner of each of the external electrodes 60 and 62 includes the rounded portion R of about 0.3 mm to about 0.5 mm, for example, a gap is present between the vicinity of the bottom of each of the external electrodes 60 and 62 of the electronic-component main body 50 in the lower tier and the cut-out portion 26. The lower end of the lower bonding portion 22 and the lower end of each of the substantially rectangular ribs 14 and 16 may preferably be in the same height position. In this case, the substantially U-shaped cut-out portion 26 is lower than the substantially rectangular ribs 14 and 16, and therefore, an externally applied stress can be sufficiently absorbed.

Figure 5:
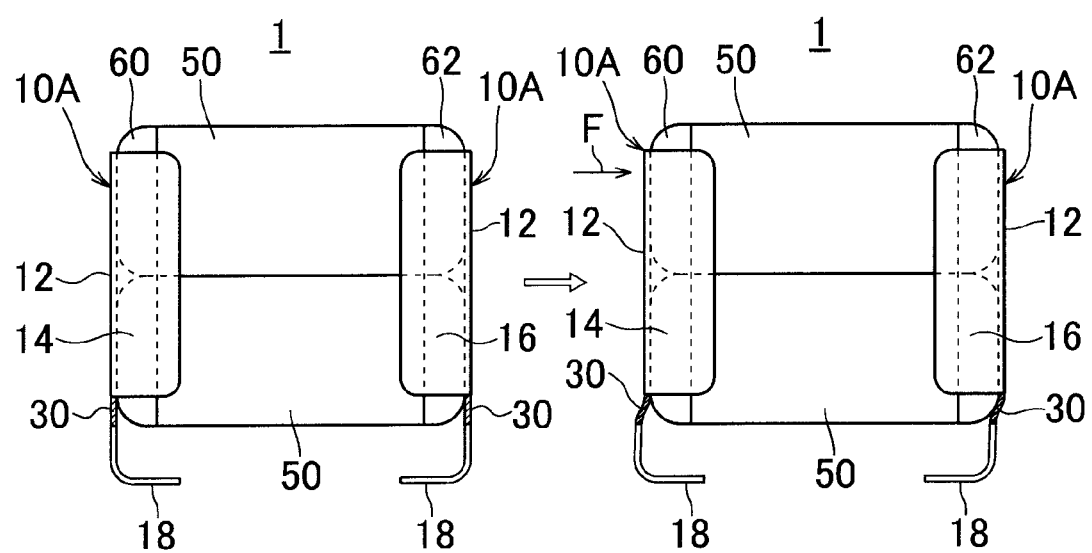
FIG. 5 is an illustration for describing an operational advantage of the ceramic electronic component.

An externally applied stress exerted on the ceramic electronic component 1 is distributed to the cut-out portions 24 and 26 and their surroundings and relieved. Specifically, as illustrated in FIG. 5, when the externally applied stress indicated by the arrow F is exerted on the ceramic electronic component 1, the hatched portions illustrated in FIGS. 4 and 5, that is, portions 30 on both sides of the cut-out portion 26 are deformed and support the electronic-component main body 50, and thus, disengagement between the bonding portions 20 and 22 of the metal terminal 10A and the external electrodes 60 and 62 can be prevented. At this time, the portions 30 on both sides of the cut-out portion 26 may preferably be disposed below the ribs 14 and 16. In this case, the portions 30 on both sides of the cut-out portion 26 are easily deformable, and the above-described advantageous effect of preventing disengagement between the bonding portions 20 and 22 of the metal terminal 10A and the external electrodes 60 and 62 can be enhanced.

Figure 6:
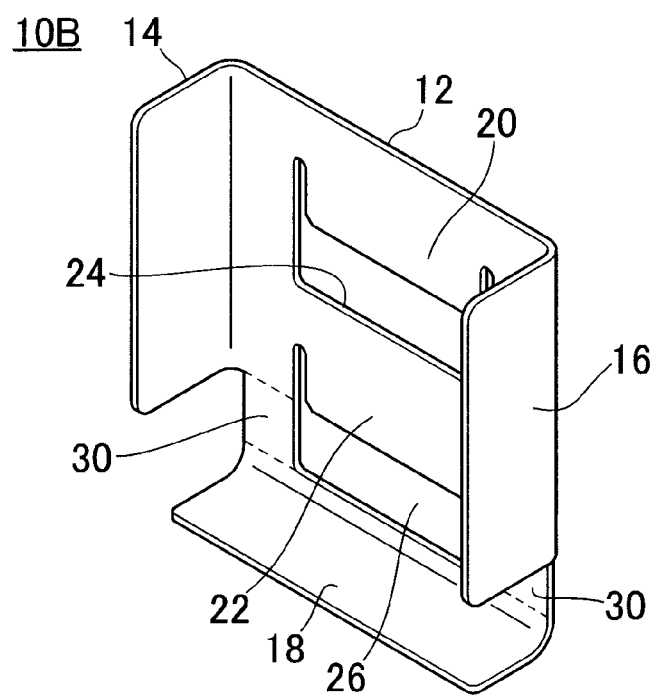
FIG. 6 is an external perspective view that illustrates a metal terminal according to another preferred embodiment of the present invention.
Figure 7:
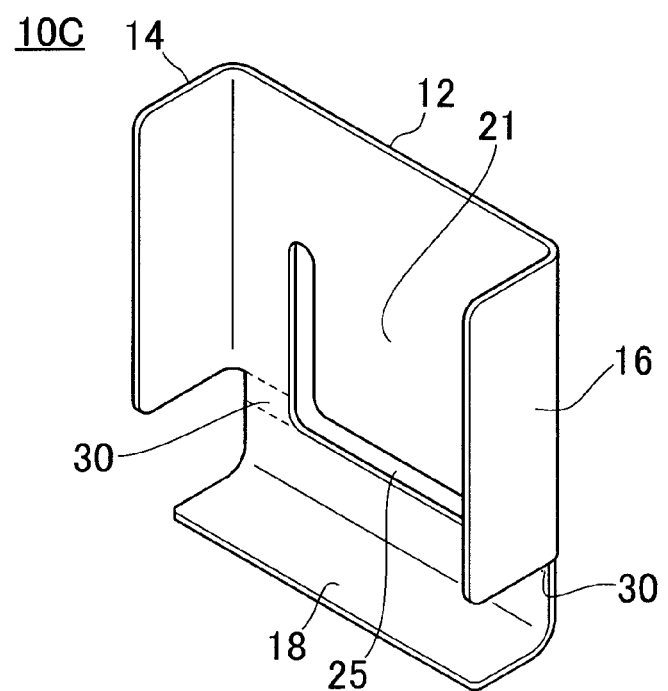
FIG. 7 is an external perspective view that illustrates a metal terminal according to yet another preferred embodiment of the present invention.
Figure 8:
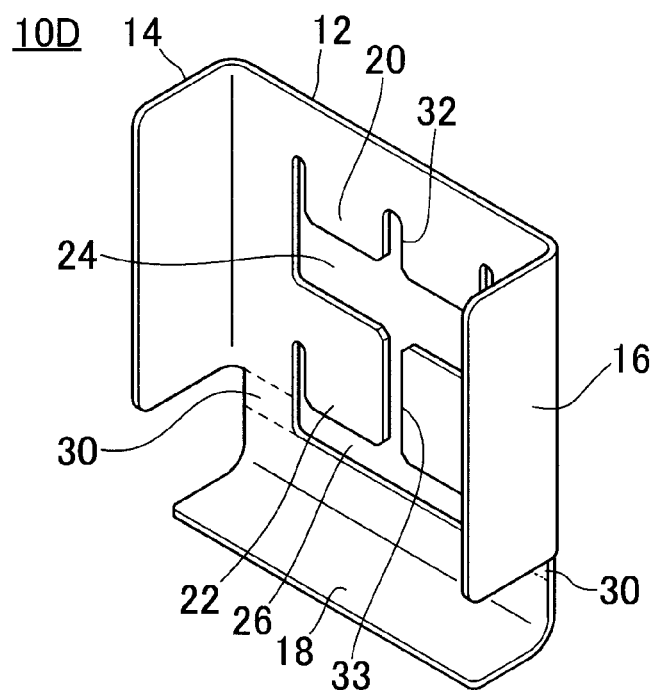
FIG. 8 is an external perspective view that illustrates a metal terminal according to still another preferred embodiment of the present invention.

FIGS. 6 to 8 are external perspective views that illustrate other preferred embodiments of a metal terminal used in the ceramic electronic component 1. In a metal terminal 10B illustrated in FIG. 6, the cut-out portion 26 has substantially the same width as that of the cut-out portion 24. Thus, the metal terminal 10B can offer substantially the same operational advantage as that of the above-described metal terminal 10A and has a large allowable amount of deformation because the size of the portions 30 on both sides of the cut-out portion 26 is increased. The same reference numerals are used as in the metal terminal 10A illustrated in FIG. 3 for similar elements, and the description thereof is not repeated here. The same applies to FIGS. 7 and 8.

A metal terminal 10C illustrated in FIG. 7 includes the substantially rectangular base 12 including a single large bonding portion 21 to be bonded to the external electrode 60 or 62 of the two electronic component main bodies 50 and a single cut-out portion 25 having a substantially U shape disposed below the bonding portion 21. The substantially U-shaped cut-out portion 25 extends around at least a partial perimeter of the bonding portion 21 in the vicinity of the mounting-side major surface 50b of the electronic-component main body 50 in the lower tier (on the mounting side). The metal terminal 10C can offer substantially the same operational advantage as that of the above-described metal terminal 10A.

A metal terminal 10D illustrated in FIG. 8 is substantially the same as the above-described metal terminal 10A illustrated in FIG. 3, except that it includes slits 32 and 33 extending in the height direction of the metal terminal 10D and the slits 32 and 33 are disposed in substantially central sections in the bonding portions 20 and 22, respectively. The bottom of the slit 32 reaches the cut-out portion 24. The top of the slit 33 reaches the cut-out portion 24, and the bottom of the slit 33 reaches the cut-out portion 26. The metal terminal 10D can offer substantially the same operational advantage as that of the above-described metal terminal 10A.

Figure 9:
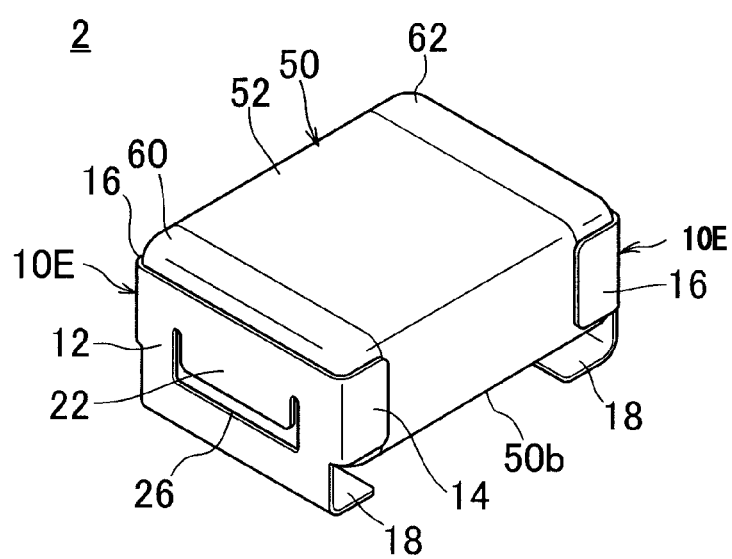
FIG. 9 is an external perspective view that illustrates a ceramic electronic component according to another preferred embodiment of the present invention.
Figure 10:
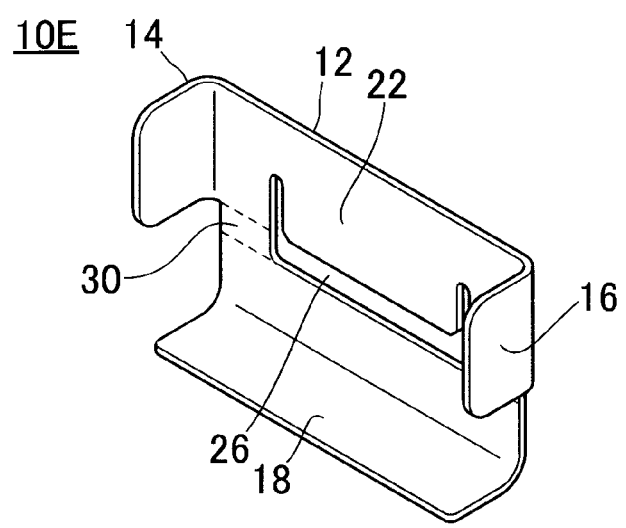
FIG. 10 is an external perspective view of a metal terminal illustrated in FIG. 9.

FIG. 9 is a perspective view that illustrates a ceramic electronic component 2 according to another preferred embodiment of the present invention. FIG. 10 is an external perspective view of a metal terminal used in the ceramic electronic component 2. In the ceramic electronic component 2, two metal terminals 10E used as one set sandwich the single electronic-component main body 50.

Because each of the metal terminals 10E preferably is of a type that holds the single electronic-component main body 50, the substantially rectangular base 12 includes the single bonding portion 22 to be bonded to the external electrode of the single electronic-component main body 50 and the cut-out portion 26 having a closed shape and being disposed below the bonding portion 22. The substantially rectangular bonding portion 22 is arranged at a substantially central location in a substantially central section of the base 12. The substantially U-shaped cut-out portion 26 extends around at least a partial perimeter of the bonding portion 22 in the vicinity of the mounting-side major surface 50b of the electronic-component main body 50. A predetermined distance is set between the cut-out portion 26 and the mounting portion 18. The appropriately set distance can ensure proper rigidity of the metal terminal 10E. The substantially rectangular ribs 14 and 16 are bent at substantially right angles from both left and right ends of the base 12 in the width direction toward the electronic-component main body 50. The ribs 14 and 16 extend from the top of the base 12 in the height direction to the vicinity of the mounting-side major surface 50b of the electronic-component main body 50 and do not reach the mounting portion 18. Thus, the rigidity of the metal terminal 10E can be improved, and a reduction in the mechanical strength of the metal terminal 10E caused by the cut-out portion 26 can be reliably compensated. The mounting portion 18 is bent at a substantially right angle from the bottom of the base 12 toward the electronic-component main body 50. The metal terminal 10E having the above-described configuration can offer substantially the same operational advantage as that of the above-described metal terminal 10A.

The single electronic-component main body 50 is held by the pair of metal terminals 10E, and the external electrodes 60 and 62 of the electronic-component main body 50 and the bonding portions 22 of the metal terminals 10E are connected by diffusion bonding. The substantially U-shaped cut-out portion 26 of each of the metal terminals 10E is arranged in the vicinity of the mounting-side major surface 50b of the electronic-component main body 50. An externally applied stress exerted on the ceramic electronic component 2 can be distributed to the cut-out portion 26 and its surroundings and relieved. Thus, disengagement between the bonding portion 22 of the metal terminal 10E and each of the external electrodes 60 and 62 can be prevented.

Next, a non-limiting example of a method of producing a ceramic electronic component having the above-described configuration is described using the ceramic electronic component 1 as an example. First, a binder (e.g., polyvinyl butyral-based binder) and an organic solvent, such as ethanol, are added to ceramic powder, and they are wet-mixed by a ball mill to make ceramic slurry. The obtained ceramic slurry is shaped into sheets by a method, such as a doctor blade method, to form substantially rectangular ceramic green sheets.

Then, conductive paste is printed on the ceramic green sheets by, for example, screen printing, to form patterns of the internal electrodes 56 and 58 thereon.

Then, a predetermined number of the ceramic green sheets with the internal electrodes 56 and 58 being formed thereon are stacked such that the side to which the internal electrode 56 is extended and the side to which the internal electrode 58 is extended are alternately arranged to form a stacked structure, a predetermined number of external-layer ceramic green sheets on which no internal electrodes are formed are stacked on the top and the bottom of the stacked structure, and a mother ceramic green sheet stack is produced. The mother ceramic green sheet stack is pressed and bonded in the stacking direction by a tool, such as a hydrostatic pressure press, if needed. The mother ceramic green sheet stack is cut into chip-shaped ceramic green sheet stacks each having a predetermined size. After that, the corners and ridges of each of the stacks are rounded by, for example, barrel polishing.

Then, these chip-shaped ceramic green sheet stacks are fired, and the chip-shaped sintered stacks 52 are obtained. Although it depends on the material of each of the ceramic and the internal electrode, the firing temperature may preferably be approximately 900 to 1300° C.

Then, conductive paste (copper paste) for the external electrodes 60 and 62 is applied on both end surfaces to which the internal electrodes 56 and 58 of the sintered stack 52 are exposed, respectively. After the conductive paste is dried, it is baked, the external electrodes 60 and 62 are obtained. The firing temperature may preferably be approximately 700° C. to 900° C., for example. In the present preferred embodiment, each of the external electrodes 60 and 62 includes an exposed copper surface. In this way, the electronic-component main body 50 with the external electrodes 60 and 62 is formed. The firing of the conductive paste and the firing of the ceramic green sheet stack can be made in the air, a nitrogen ($N_2$) environment, or an environment of vapor and nitrogen ($N_2$), for example.

Then, the metal terminal 10A is attached on each of both ends of the electronic-component main bodies 50. That is, after the single pair of the metal terminals 10A become opposed to each other and sandwich the electronic-component main bodies 50, the bonding portions 20 and 22 of the metal terminals 10A are diffusion-bonded to the external electrodes 60 and 62 of the electronic-component main bodies 50. Heat occurring in the bonding portions 20 and 22 in diffusion bonding is interrupted by the cut-out portions 24 and 26 and is not directly transmitted to the mounting portion 18. Accordingly, degradation in the tin plating film on the surface of the mounting portion 18 caused by heat can be prevented.

Figure 11:
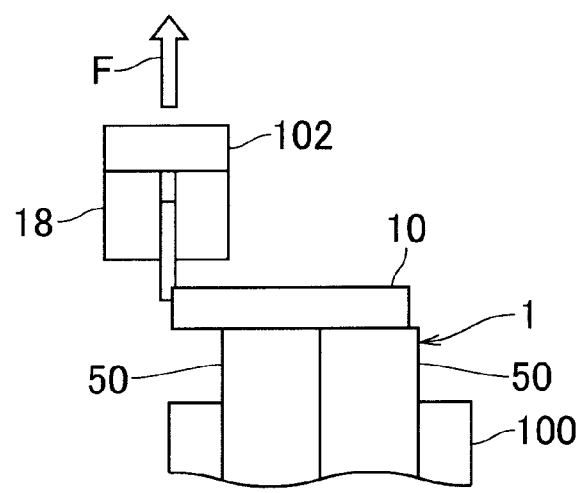
FIG. 11 is a schematic side view for describing a tensile test.

Next, evaluation tests of the ceramic electronic component 1 were conducted. The bond strength between the bonding portions 20 and 22 of the metal terminal 10 and the external electrodes 60 and 62 of the electronic-component main body 50 was measured by a tensile test. That is, as illustrated in FIG. 11, the electronic-component main body 50 is held by a fixing and grasping member 100 of a tensile test machine. After that, the mounting portion 18 of the metal terminal 10 is caught by a movable chuck 102 of the tensile test machine and pulled in the direction indicated by the arrow F at a speed of approximately 0.5 mm/sec, the strength at the time when any of the bonding portions 20 and 22 is detached from the external electrode 60 or 62 is measured, and the destruction state at that time is recorded. The tensile test is conducted in the state where the mounting portion 18 is bent at a substantially right angle in a direction opposite to the electronic-component main body 50.

Figure 12A:
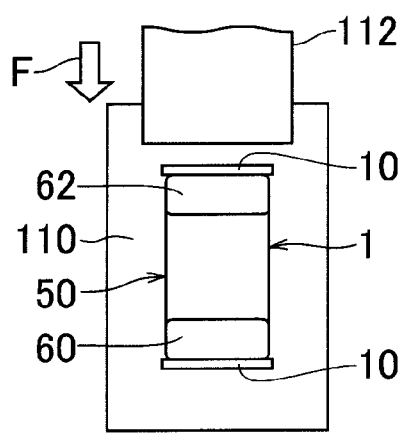
FIG. 12A is a schematic plan view for describing an L-direction adherence test.
Figure 12B:
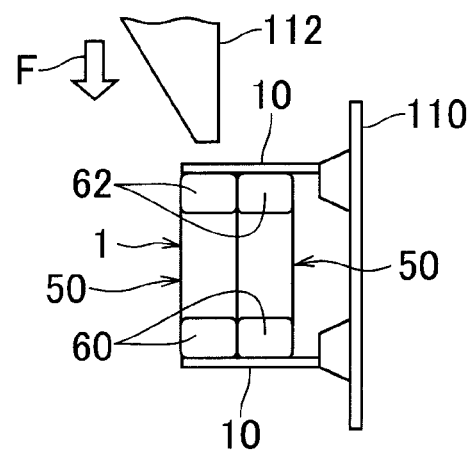
FIG. 12B is a schematic side view thereof.

As illustrated in FIGS. 12A and 12B, after the ceramic electronic component 1 was mounted on a mounting board 110 by soldering, an L-direction adherence test was conducted. That is, after the mounting board 110 is held, the ceramic electronic component 1 is pressed by a pressing jig 112 at a speed of approximately 0.5 mm/sec in its longitudinal direction L (the direction indicated by the arrow F). The strength at the time when the metal terminal 10 is detached from any of the external electrodes 60 and 62 or at the time when another portion is destructed is measured, and the destruction state at that time is recorded. The thickness of the tip of the pressing jig 112 is approximately 0.5 mm, and the pressing position in the height direction is in a substantially central section of the electronic-component main body 50 in the upper tier.

FIGS. 13 and 14 are tables of evaluation results. FIG. 13 illustrates results of comparison among the case where a metal terminal does not include a cut-out portion having a closed shape (Comparative Example 1) and the cases where a metal terminal includes at least one cut-out portion having a closed shape (Examples 1 to 3). In Example 1, the metal terminal 10C illustrated in FIG. 7 is used. In Example 2, the metal terminal 10D illustrated in FIG. 8 is used. In Example 3, the metal terminal 10B illustrated in FIG. 6 is used. FIG. 13 demonstrates that the cut-out portions 24, 25, and 26 disposed below the bonding portions 20, 21, and 22 can relieve an externally applied stress that would be a cause of detachment of the bonding portions 20 to 22 from the external electrodes 60 and 62, and the bond strength can be increased.

FIG. 14 illustrates results of comparison between the case where a metal terminal includes no ribs (Comparative Example 2) and the case where a metal terminal includes ribs (Example 2). In Example 2, the metal terminal 10D illustrated in FIG. 8 is used. FIG. 14 demonstrates that the ribs 14 and 16 bent toward the electronic-component main body 50 can increase the bond strength. The ribs 14 and 16 can improve the rigidity of the metal terminal 10D and can compensate for a reduction in the mechanical strength caused by the cut-out portions 24 and 26. Here, when a stress is exerted on the ceramic electronic component 1, the metal terminal 10D is deformed by that stress, and the electronic-component main body 50 and the metal terminal 10D are disengaged. Accordingly, if the rigidity of the metal terminal 10D is improved and the metal terminal 10D is not deformed, the bond strength between the metal terminal 10D and the electronic-component main body 50 is increased.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A ceramic electronic component comprising:
   at least one electronic-component main body including two opposed major surfaces, two opposed end surfaces, two opposed side surfaces, and an external electrode that covers each of the two opposed end surfaces; and
   a metal terminal connected to the external electrode of the electronic-component main body by a diffusion bond; wherein
   the metal terminal includes a base, ribs, and a mounting portion, the ribs being bent from both left and right sides of the base in a width direction connecting the two end surfaces of the electronic-component main body to the electronic-component main body, the mounting portion being bent from a bottom of the base in a height direction connecting the two major surfaces of the electronic-component main body;
   the base includes a bonding portion bonded to the external electrode of the electronic-component main body and at least one cut-out portion that has a closed shape and that is disposed below the bonding portion in the height direction, and a predetermined distance is set between the cut-out portion in the base and the mounting portion;
   each of the ribs extends from a top of the base in the height direction to an area of a mounting-side major surface of the electronic-component main body and does not reach the mounting portion; and
   the mounting portion is define by a single unseparated surface.

2. The ceramic electronic component according to claim 1, wherein the cut-out portion extends around at least a partial perimeter of the bonding portion.

3. The ceramic electronic component according to claim 1, wherein the cut-out portion is substantially U-shaped.

4. The ceramic electronic component according to claim 1, wherein the at least one electronic-component main body comprises a plurality of electronic-component main bodies.

5. The ceramic electronic component according to claim 4, wherein, when the at least one electronic-component main body comprises the plurality of electronic-component main bodies, the at least one cut-out portion comprises a plurality of cut-out portions each having a closed shape, each of the plurality of cut-out portions being disposed in an area of a bottom of a respective one of the plurality of electronic-component main bodies.

6. The ceramic electronic component according to claim 5, wherein, of the plurality of cut-out portions, the cut-out portion adjacent to the mounting portion in a height direction of the metal terminal has the smallest width.

7. The ceramic electronic component according to claim 1, wherein the external electrode of the electronic-component main body includes an exposed copper surface.

* * * * *